United States Patent

[11] 3,578,781

| [72] | Inventors | Albert Abrams;<br>Harold J. Hill; David R. Thigpen, Houston, Tex. |
|---|---|---|
| [21] | Appl. No. | 789,002 |
| [22] | Filed | Dec. 31, 1968 |
| [45] | Patented | May 18, 1971 |
| [73] | Assignee | Shell Oil Company<br>New York, N.Y. |

[54] CLAY TREATING AND OIL-WETTING DISPERSION AND METHOD OF USE THEREOF
6 Claims, No Drawings

[52] U.S. Cl. .................................................. 166/305, 252/8.55
[51] Int. Cl. .................................................. E21b 43/25
[50] Field of Search .......................................... 166/275, 274, 305, 306; 252/8.55 (D), 8.55 (C), 8.55 (B), 8.55 (A)

[56] References Cited
UNITED STATES PATENTS

| 2,761,835 | 9/1956 | Brown | 252/8.55 |
|---|---|---|---|
| 2,761,843 | 9/1956 | Brown | 252/8.55 |
| 3,326,287 | 6/1967 | Corrin | 166/305X |
| 3,348,611 | 10/1967 | Reisberg | 166/275 |
| 3,349,032 | 10/1967 | Krieg | 166/275 |
| 3,389,750 | 6/1968 | Bohor et al. | 166/305 |
| 3,422,890 | 1/1969 | Darley | 166/305X |
| 3,467,194 | 9/1969 | Kinney et al. | 166/305 |

*Primary Examiner*—Stephen J. Novosad
*Attorneys*—George G. Pritzker and J. H. McCarthy ABSTRACT: Permeability characteristics of a subterranean earth formation are improved by permeating them with a clay treating and oil-wetting dispersion of a surface active salt of a surface active cation and a surface active anion in an aqueous liquid solution containing electrolyte and water-soluble surfactant.

3,578,781

CLAY TREATING AND OIL-WETTING DISPERSION AND METHOD OF USE THEREOF

CROSS-REFERENCE TO RELATED APPLICATIONS

This application is related to copending patent applications, Ser. No. 603,722 filed Dec. 22, 1966 which matured as U.S. Pat. No. 3,422,890 on Jan. 21, 1969, and Ser. No. 717,402 filed Mar. 29, 1968 which has matured as U.S. Pat. 3,483,923, on Jan. 16, 1969.

BACKGROUND OF THE INVENTION

A well-treatment process is conducted by pumping fluid through a well and injecting it into the immediately adjacent portion of the surrounding earth formation. The volume of the fluid is generally sufficient to fill the pore space of only the portion of earth formation that is located within about the first few feet of distance (generally less than 10 feet) away from the well.

In numerous oil-containing subterranean reservoir formations, some or all of the earth formations in the interval into which or from which fluids are to be injected or produced have permeability characteristics such that the flow of fluid is, or is apt to become, impeded. For example, such an interval may contain one or more portions in which the rocks are water-wet and contain sufficient residual oil to impede the flow of water. Such rocks may also contain materials, such as water-sensitive clays, which swell and reduce the permeability of the earth formation when they are contacted with any aqueous fluid that contains less dissolved salts than the connate water. In general, the permeability characteristics of many subterranean reservoir formations can be improved by increasing the extent to which the rocks are oil-wet. In addition, further improvements in fluid mobility can be obtained by displacing some or all of the residual oil.

Various well treatments have been previously proposed for improving the permeability characteristics of reservoir formations by increasing the oil-wetness of the rocks and/or desensitizing water-sensitive clays. A series of U.S. Pat. Nos., from 2,761,835 to 2,761,843, propose that the rocks be contacted with aqueous solutions of inorganic acid salts of various amines. U.S. Pat. No. 3,389,750 proposes a clay treatment that is conducted during an oil production process in which the rocks are first contacted with a spearhead of a relatively concentrated aqueous solution containing a potassium salt, a cationic trimethylene diamine and a high molecular weight imidazoline, and are then continuously flooded with a more dilute solution of the same components.

The above-identified U.S. Pat. Nos. 3,422,890 and 3,483,923 propose that the earth formations around a well be contacted with an oil-in-water emulsion in which an oil solution that contains a preferentially oil-soluble surfactant is dispersed in an aqueous solution of an electrolyte and a water-soluble surfactant. The processes of the copending applications provide a significant improvement (relative to the extent of effect obtained by previously proposed treatments) and (a) improve the degree to which the treated rocks are oil-wetted and (b) coat the rocks with a preferentially oil-soluble material that remains effective while fresh water or brine (which are free of surfactant) are flowed through the rocks.

SUMMARY OF THE INVENTION

The objects of this invention include the provision of (1) an improved well treatment for increasing the oil-wetness of a permeable earth formation, (2) an oil-wetting and/or clay-treating aqueous liquid dispersion of a surface active salt of a surface active cation and a surface active anion that comprises a relatively low cost well-treatment fluid and is capable of displacing residual oil to a selected degree, and (3) a treatment process for clay treatment and/or oil-wetness enhancement in which a selected degree of reduction is made in the concentration of the residual oil in the rocks being treated, etc.

It has now been discovered that both the relatively high degree of increased oil-wetness and/or clay desensitization and the long-time stability of treatment that are provided by treatments with the oil-in-water emulsions of the above-identified patents can be attained by permeating a subterranean earth formation with a dispersion of a preferentially oil-soluble, surface active salt of at least one surface active cation and at least one surface active anion in an aqueous solution of an electrolyte and at least one preferentially water-soluble surfactant when the particles of the dispersed salt are large enough to be preferentially absorbed on rock surfaces but are small enough to penetrate into the pores of the subterranean earth formation.

The extent to which the surface active salt is dispersed or suspended in the aqueous saline solution is important. The effect on clay components of porous earth formations becomes less pronounced as the extent of dispersion becomes low enough to allow the dispersed particles to become larger than the pores of the subterranean earth formation so that they tend to be screened-out on the face of the formation. Particles that will enter the pores of most subterranean earth formations into which wells are completed have particle sizes below about 5 microns in average diameter. The effect on the clay components is similarly lessened as the extent of the dispersion becomes high enough to retard the adsorption of the surface active salt on the rock surfaces. The extent of the dispersion is strongly affected by the proportions and composition of the surface active salt, water-soluble surfactant and electrolyte. The surfactant materials (both the surface active salt and the water-soluble surfactant) should be used in relatively small proportions in order to keep the chemical cost low, i.e., used in porportions of from about 0.1 to 2.0 percent by volume of the dispersion. Similarly, the proportions of electrolyte are preferably kept at or near the proportions of the total dissolved solids which are present in waters available at the well site.

Procedures and techniques for adjusting and testing the extent of dispersion of the surface active salt in the aqueous saline solution are analogous to those for dispersing and testing the dispersion of the droplets of the oil-phase components of the oil-in-water emulsions of the above-identified patents. The attainment of sufficient dispersion is indicated by filter tests such as those described in the copending patent applications. The attainment of too much dispersion tends toward complete solubilization and reduces the extent of oil-wetting and/or clay treating that is effected by contacting an earth formation with the dispersion. The extent of oil-wetting or clay treating can readily be measured by known techniques, such as measuring permeability to fresh water, the extent of oil imbibition, etc.

The surface active salt component of the present dispersion can be formed by at least partially neutralizing one or more cationic surface active materials with one or more anionic surface active materials. The resultant salt can be separated from the reaction mixture, and one or more of said salts can be dispersed in the aqueous solution. Alternatively, the surface active salt can be formed by intermixing one or more of a cationic and an anionic surface active material, an electrolyte and a preferentially water-soluble surfactant and water. The surface active salt components are relatively high molecular weight, preferentially oil-soluble surface active materials that (a) tend to be relatively insoluble, but readily dispersible or suspendable, in aqueous liquids and (b) tend to be strongly adsorbed on the surfaces of rocks. A particularly suitable type of such a surface active salt component comprises a reaction product of an oil-soluble salt of a N-alkyl-substituted polyamine and a fatty acid or a dimer acid. Compounds of this type can be prepared by the methods described in U.S. Pat. Nos. 2,736,658; 2,798,045; or 3,017,360. Salts of this type are manufactured by Armour Industrial Chemical Company under the name of Redicote 75TXO and such salts may have the general formula $[RNH(CH_2)_xNH_2]^{++}2[OOCR]$ and can include Duomeen T-mono and dioleate or Duomeen S-mono and dioleate, or Duomeen C-mono and dioleate wherein the Duomeens are fully described in U.S. Pat. No. 2,798,045. The corresponding laurates, stearates and the like can be used as substitutes or in mixtures with oleate salts. Preferred surface active salts include Redicote 75TXO and Duomeen TX salts of surface active sulfonates.

Cationic surface active materials suitable for use in forming the surface active salts comprise those containing a basic polar group such as an amion nitrogen group. One suitable type of such materials comprise quaternary ammonium halides, such as those described in U.S. Pat. Nos. 2,775,617; 2,933,530; 2,950,318; 3,024,283; 3,073,864; and 3,175,008 and are manufactured by Armour Industrial Chemical Company under the name of Redicote $E_{11}$. Redicote $E_{11}$ is a chloride of quaternary ammonium compound having the formula

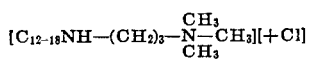

which is normally available as a solution in isopropyl alcohol for ease of handling and dissolving it and emulsifying it in an oil mixture and water. A well-known process of preparing quaternary ammonium compounds which is in rather widespread industrial use, involves the alkylation of alkyl secondary amines with alkyl halides to produce tetra-alyky ammonium halides. A particularly suitable type of cationic surfactant materials comprise the trimethylene diamine cationic surfactants such as those derived from fatty acid containing from about 14 to 18 carbon atoms with or without the attachment of one or more ethylene oxide groups to one or more of the amino nitrogen atoms. Such trimethylene diamines are commercially available from the Armour Industrial Chemical Company under the names of Duomeens, Ethoduomeens, or N-Tallow Trimethylene Diamines.

Anionic surfactant materials suitable for use in forming the surface active salt comprise those containing an acidic polar group such as a sulfonic acid, sulfuric acid or carboxylic acid group. Such materials include organic sulfonates, sulfates, phosphates, carboxylates, thiocarbamates and the like, as well as mixtures thereof and their ethoxylated derivatives. These surfactants are described in the Encyclopedia of Chemical Technology, Vol. 13, pages 513—535 or those listed in Schwartz and Perry on "Surface-Active Agents" or other such texts and references. Anionic surfactants of this type can be illustrated by metal organo sulfonates, e.g., alkali metal and polyvalent metal petroleum sulfonate, benzene sulfonate, naphthalene sulfonate, aniline sulfonate, alkylated benzene sulfonate; alcohol sulfates, e.g., $C_{8130}$ alcohol and ethoxylated derivatives thereof; the carboxylates, e.g., alkali metal organo phosphates and their ethoxylated derivatives and mixtures thereof. Preferred are the alkali metal (Na, K, Li) petroleum sulfonates, $C_{15118}$ alkyl sulfonate, alkylated benzene sulfonates and the alcohol sulfates and their ethoxylated derivative. Materials of this type are sold commercially under various trade names such as petroleum sulfonates sold by Bray Chemical Company or the Bryton Chemical Company as Bryton sulfonates F, 430, 467, 500 or Socony Mobil Oil Company "Promor" sulfonates of the SS-6, SS-20 series; American Cyanamid's "Aerosol OT" which is Na dioctyl sulfosuccinate and the like. Particularly suitable anionic surfactants comprise the alkyl lauryl sulfonates often classified as sulfated, and/or the sulfonates or sulfates of petroleum hydrocarbons high molecular weight alcohol, epoxylated alcohols or the like, such as the mahogany or green petroleum sulfonates, the Neodol ® sulfates (commercially available from Shell Development Company), etc. Sulfates of ethoxylated primary alcohols include, for example, Neodol 23–3A, $C_{12115}H_{25131}O(CH_{bv}{}^{CH}{}_2O)_3SO_4NH_4$ Neodol 25–3S, $C_{12115}H_{25131}O(CH_2CH_2O)_3SO_4Na$, etc. Other sulfated ethoxylated alcohols are available from Union Carbide under the trade name Tergitol S. Naturally occurring and/or synthetic surface active naphthenic acids may also be used. In certain reservoir crudes, e.g., a Ventura crude oil, such naphthenic acids are present in the reservoir oil and can be mixed, in situ, with the surface active cation, aqueous electrolyte and aqueous solution of water-soluble surfactant components to form at least some of the surface active salt that is contained in a dispersion of the type contemplated by the present invention.

Water-soluble surface active materials suitable for use in dispersing the surface active salt in an aqueous liquid comprise preferentially water-soluble cationic, anionic or nonionic surfactants, including those of the types described above. Where the surface active salt is formed by the neutralization reaction of, for example, a water-soluble cationic surfactant and a water-soluble anionic surfactant, by using an excess of either component, the unreacted portion of that component can be utilized as the water-soluble surfactant dissolved in the aqueous liquid into which the surface active salt is dispersed. Nonionic surfactants contain substantially neutral polar groups such as alcohol, ether, or the like groups. Such materials comprise the ethylene oxide, fatty acid condensates, the alkyl lauryl polyether alcohols, fatty alcohol-ethylene oxide condensates, polyoxy ethylene thioethers, polypropolene glycol-ethyelen oxide condensates, and the like. Particularly suitable materials comprise the Redicote $E_{11}$ and Neodol 23–6.5. Other particularly suitable nonionic surfactants are sold by Armour Industrial Chemical Company under the trade name Redicote $E_{12}$. Such surfactants may be made by reacting an alkyl-phenol with ethylene glycol to yield a preferentially water-soluble alkyl phenoxy polyalkylene glycol.

Water-soluble electrolytes suitable for use in the aqueous liquid into which the surface active salt is dispersed comprise polar inorganic compounds which are water-soluble and substantially inert toward the surface active materials that are used. Typical examples comprise the sodium, calcium, magnesium, or the like salts of hydrochloric, sulfuric, carbonic, or the like acids, such as sodium chloride, magnesium chloride, calcium sulfate, sodium bicarbonate, sodium carbonate, etc. The electrolytes used are preferably those contained in the waters readily available at the well site. The extent of the dispersion of the surface active salt is I–controlled by adjusting the concentration of the preferentially water-soluble surfactant in an aqueous liquid solution containing such electrolytes in the concentrations in which they are readily available.

EXAMPLE I—OIL-WETTING AND/OR CLAY-TREATING AQUEOUS DISPERSION

A particularly suitable dispersion contain the designated constituents in the indicated proportions in percent by volume.

| Constituent | Volume percent |
|---|---|
| Duomeen TX (Armour Industrial Chemical Company) | 0.04 |
| Petroleum sulfonate (a commercially available mahogany sulfonate having an average molecular weight of 430 and containing 50% active ingredient) (Shell Chemical Company) | 0.17 |
| NEODOL 23–6.5 (Shell Chemical Company) | 0.2 |

Such a dispersion is preferably compounded by heating about four volumes of the Duomeen TX and 17 volumes of the petroleum sulfonate to a temperature of about 160° F. and blending the heated materials into 20 volumes of the Neodol 23–6.5. This produces a concentrate which is liquid and which can be mixed directly with an aqueous solution containing an electrolyte, to provide a dispersion containing about 0.4 percent of surface active components.

The extent to which the surface active salt is dispersed can be determined in the manner described in the above-identified copending patent applications. The extend of the dispersion can be varied by varying the proportions of the dissolved electrolyte and/or dissolved preferentially water-soluble surfactants.

In the dispersion provided by the above formulation the size of the dispersed particles of surface active salt are near but below the 5 micron range. The effect provided by this formulation is predominantly clay-treating and/or oil-wetting with a relatively small amount of oil-displacing.

In a particularly useful modification of the above formulation the proportion of the Neodol 23–6.5 is increased to 0.5 percent while keeping the same proportion for all other ingredients except for water. In the modified formulation the size of the dispersed particles of surface active salt is near but above the size of an oil-phase material solubilized in an aqueous phase. The effect provided by the modified formulation is a relatively enhanced extent of oil-displacement coupled with an extent of clay-treatment and/or oil-wetting that is substantially equal to that of the formulation described above.

EXAMPLE II—WELL TREATMENT

A dispersion compounded substantially as described in example I but containing the constituents indicated below was field tested in water injection wells into which it was desirable to inject a blend of fresh water and a formation water that was available near the well site, where the blend contained a total dissolved solid content of about 4,000 ppm.

| Constituent | Volume percent |
|---|---|
| Redicote 75TX0 (Armour Industrial Chemical Company) | 0.2 |
| Redicote $E_{11}$ (Armour Industrial Chemical Compnay) | 0.25 |
| Redicote $E_{12}$ (Armour Industrial Chemical Company) | 0.05 |

In the test wells the injectivity to the blend water had previously become impaired during an injection of blend water.

The wells were treated by (1) injecting brine containing about 23,000 ppm dissolved salts for 5 days, (2) acidizing the wells with about 2,000 gallons per well of 15 percent hydrochloric acid, (3) resuming the brine injection for about 2 days, (4) injecting about 3,000 barrels per well of the dispersion of example I, (5) resuming the brine injection for about 5 days, and (6) gradually changing the composition of the fluid being injected from that of the brine to that of the blend water.

The results of these treatments are summarized in the following table:

| | Pressure | Injection rate | |
|---|---|---|---|
| | Original | After treatment | Original, B/D | After treatment, B/D |
| 1 well | | Kept constant | 400 | 1,000. |
| Do | | Lower after treatment | 1,300 | 2,400. |
| 1 well, p.s.i. | 1,750 | 850 | | Rate constant. |

In view of the preexisting information and experience relative to the effects of acid treatments and brine injections in this field, it was concluded that the injection of the dispersion resulted in a restoration of the swollen clays to their original conditions and a desensitization of the clays against further swelling in addition to providing a significant improvement in the mobility of aqueous fluid within the reservoir.

EXAMPLE III—LONG TIME STABILITY

Cores of typical oil-bearing subterranean reservoir formations were treated with the dispersion of example II and were then subjected to the flows of fluids through the cores to determine the stability of the oil-wetting and/or clay treatment provided by the dispersion. The cores which were used had a residual oil saturation of about 40 percent pore volume and contained water-sensitive clays which are typical of reservoir formations having undesirable permeability characteristics.

In one experiment a Berea core was treated with two pore volumes of the oil-wetting dispersion, 2 pore volumes of a typical formation water containing about 23,000 ppm total dissolved solids (mainly NaCl), 2 pore volumes of Triton X-100 in formation water, 3 pore volumes of formation water, 21 pore volumes of simulated source water and 20 pore volumes of distilled water. Permeability at the end of this sequence was about three times the permeability to formation water at residual oil saturation. No evidence of mobile clays was observed. In one other Berea experiment clays remained inhibited after 34 pore volumes of flooding including 1 pore volume of crude oil and 5 pore volumes of a sulfonate-Triton X-100 chemical flood. In one experiment with a Ventura core, clays remain inhibited (to 100 percent simulated source water) after 2,000 pore volumes of flooding with Triton X-100-sulfonate, crude oil, sulfonate and various blends of formation water and source water.

EXAMPLE IV—RANGE OF MOBILITY CONTROL

The ease with which either an oil-phase or an aqueous-phase fluid will move through a porous earth formation is strongly affected by the effective oil-wetness of the rock surfaces (where at least some residual oil is present), the amount of residual oil in the zones being swept by the fluid and any tendency of the rock materials to swell or become dispersed when contacted by the fluid (in addition to the natural permeability of the earth formation). Particularly in a zone of relatively low permeability, where the interconnected pores are small, the flow of an aqueous fluid becomes increasingly difficult with increases in the water-wetness of the rocks. Where such a zone contains an appreciable amount of residual oil, the mobility of the aqueous fluid is further restricted by the pore-blockage effect of the oil droplets. Where such a zone contains water-sensitive clay components, an aqueous fluid having a relatively low electrolyte content exhibits a relatively low mobility that becomes further decreased as the clay swells or disperses and reduces the effective permeability of the formation.

Therefore, in a reservoir interval that has a low average permeability and contains residual oil and water-sensitive clays in, respectively, layers of relatively low and relatively high permeability, it is advantageous to be able to stabilize the clays with treatment fluids having differing tendencies to displace residual oil. For example, by displacing little or no residual oil from a relatively permeable zone, while displacing substantially all of the residual oil from the relatively low permeable zone, the effective permeability of the reservoir interval becomes nearly uniform, so that an injected aqueous fluid tends to flow uniformly throughout substantially all of the reservoir interval.

In the aqueous dispersions of the present invention, as long as the particles of dispersed surface active salt are small enough to enter the pores of the earth formation but are larger than the particles of a solubilized oil-phase material, the dispersion increases the oil-wetness of a rock formation and insensitizes any water-sensitive clay that it contains. Since the clay treatment increases the oil-wetness of the clays such a clay treatment inherently provides some increase in the oil-wetness of the earth formation. However, by formulating the dispersion so that the particles sizes are near but below the 5 micron range, the oil-displacing tendency of the dispersion is reduced. Similarly, by formulating the dispersion so that the particle sizes are near but above the solubilization range, the oil-displacing tendency is increased without a significant reduction in the extent of the clay-treatment effect.

The following table is indicative of the range of mobility control and is made available by the present invention:

| | Mobility after Treating [1] | | Treating Solution Formulation [2] | |
|---|---|---|---|---|
| Run No. | Salt Water [2] | Fresh Water [3] | Wetting Agent (Wt%) | Dispersants (Wt%) |
| 682 | 1.0 | 0.38 | None | None |
| 575 | 2.8 | 2.4 | TXO (0.2) | $E_{11}$ (0.4) |
| 589 | 3.1 | 2.9 | TXO (0.2) | $E_{11}$ (0.25); $E_{12L}$ (0.05) |
| 607 | 3.9 | 4.5 | TXO (0.2) | $E_{11}$ (0.1); N23–6.5 (0.1) |
| 606 | 0.8 | 4.1 | DTX (0.033); $SO_3R$ (0.167) | N23–6.5 (0.2) |
| 609 | 5.5 | 7.9 | DTX (0.033); $SO_3R$ (0.167) | N23–6.5 (0.5) |
| 632 | 6.6 | 10.1 | DTX (0.033); $SO_3R$ (0.167) | N23–6.5 (0.7) |

[1] Mobility to specified aqueous solution after treating divided by mobility to salt water/$SO_r$ before treating.
[2] All solutions formulated in simulated field water containing about 4000 ppm TDS (total dissolved solids).
[3] Simulated field fresh water containing about 23,000 ppm TDS.

Where TXO is Redicote 75TXO,
$E_{11}$ is Redicote $E_{11}$,
N23–6.5 is Neodol 23–6.5,
DTX is Duomeen TX, and
$SO_3R$ is petroleum sulfonate.

We claim:

1. An oil-wetting aqueous liquid dispersion consisting essentially of:
   an oil-free aqueous liquid solution containing therein (a) at least one water-soluble electrolyte, (b) a preferentially water-soluble surfactant, and (c) a preferentially oil-soluble, surface active salt of at least one surface active cation and at least one surface active anion; and
   said surface active salt is dispersed to an extent such that the particles of the surface active salt are large enough so that they are preferentially adsorbed on surfaces of an earth formation that is contacted by the aqueous liquid solution and are small enough to penetrate into the pores of an earth formation.

2. The dispersion of claim 1 in which:
   said surface active salt is a reaction product of an oil-soluble salt of an N-alkyl-substituted polyamine and a monomeric or dimeric fatty acid; and
   said preferentially water-soluble surfactant is a mixture of a quaternary ammonium salt of a diamine and an alkyl phenoxy polyalkylene glycol.

3. The dispersion of claim 1 in which:
   said surface active salt is a salt of a N-alkyl-substituted polyamine and a petroleum sulfonate; and
   said preferentially water-soluble surfactant is an ethoxylated alcohol.

4. In a well treatment process in which a portion of the earth formation around a well is permeated with a fluid, the improvement which comprises:
   dispersing a preferentially oil-soluble, surface active polyamine salt of at least one anionic surfactant and at least one cationic surfactant in water containing at least one water-soluble electrolyte and at least one preferentially water-soluble ethoxylated alcohol surfactant;
   dispersing said surface active salt in said solution to an extent such that particles of the surface active salt are small enough to penetrate into the pores of a porous earth formation but are large enough so that the surface active salt is preferentially adsorbed on surfaces of an earth formation that is contacted by said dispersion; and
   permeating a portion of the earth formation around a well with said dispersion.

5. The process of claim 4 in which:
   said surface active salt is a N-alkyl-substituted polyamine;
   said preferentially water-soluble surfactant is an ethoxylated primary alcohol; and
   the earth formation into which the dispersion is injected contains oil in which naphthenic acids are present.

6. In a process for treating a well which has been complete into an interval of oil-containing earth formations that contains at least one zone of relatively high and one zone of relatively low permeability, the improvement which comprises:
   dispersing a preferentially oil-soluble surface active salt of at least one anionic surfactant and at least one cationic surfactant in an aqueous liquid solution that contains at least one water-soluble electrolyte and at least one preferentially water-soluble surfactant;
   establishing preferential fluid-communication with the zone of said reservoir interval that has the relatively high permeability and injecting said dispersion with said surface active salt being dispersed to an extent such that its particles are relatively large but are small enough to penetrate into the pores of the earth formation; and
   establishing preferential fluid communication with the zone of said reservoir interval that has a relatively low permeability and injecting said dispersion with said surface active salt being dispersed to an extent such that its particles are relatively small and somewhat solubilized but are large enough to be preferentially adsorbed on surfaces of the earth formation.